Patented Jan. 6, 1925.

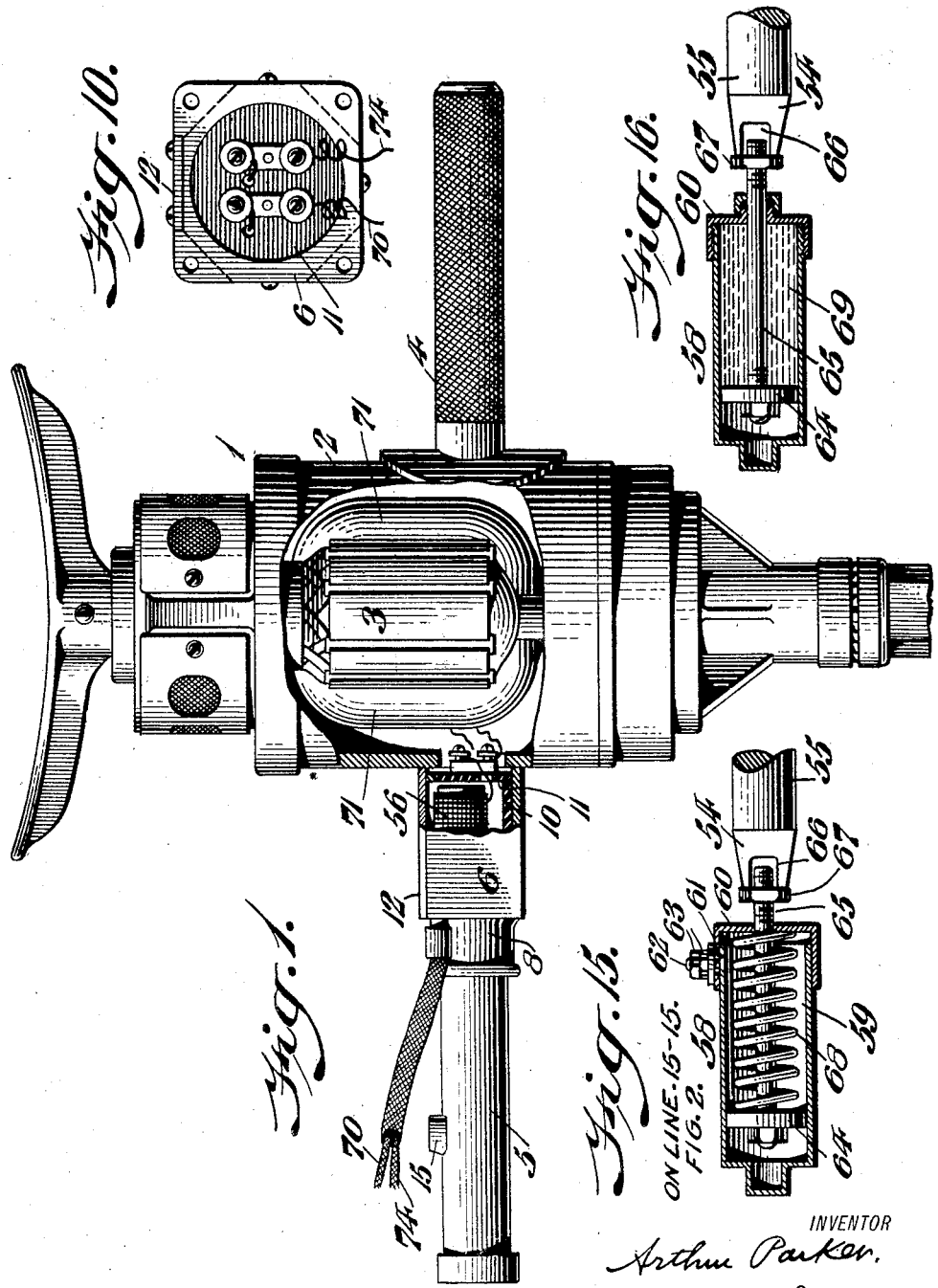

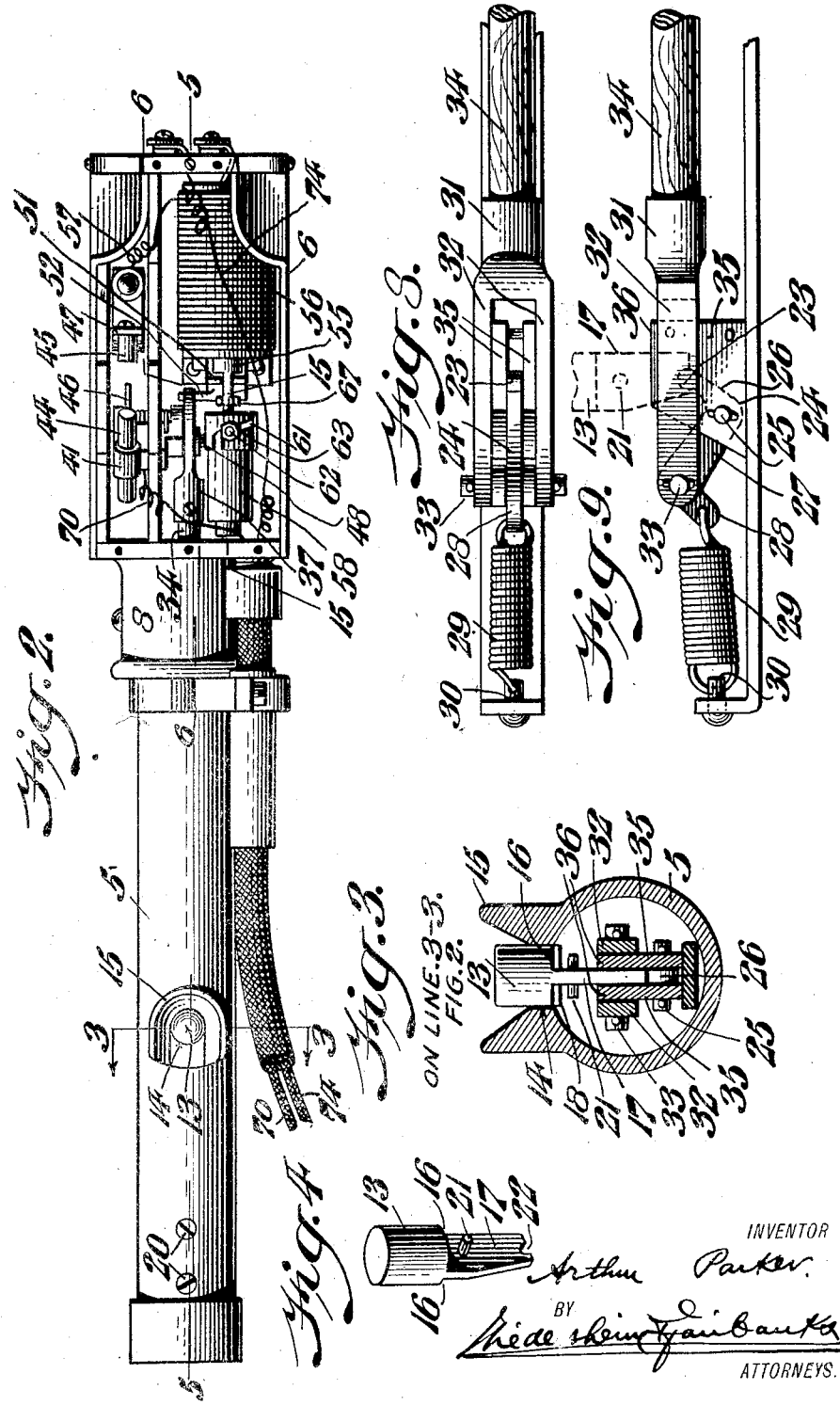

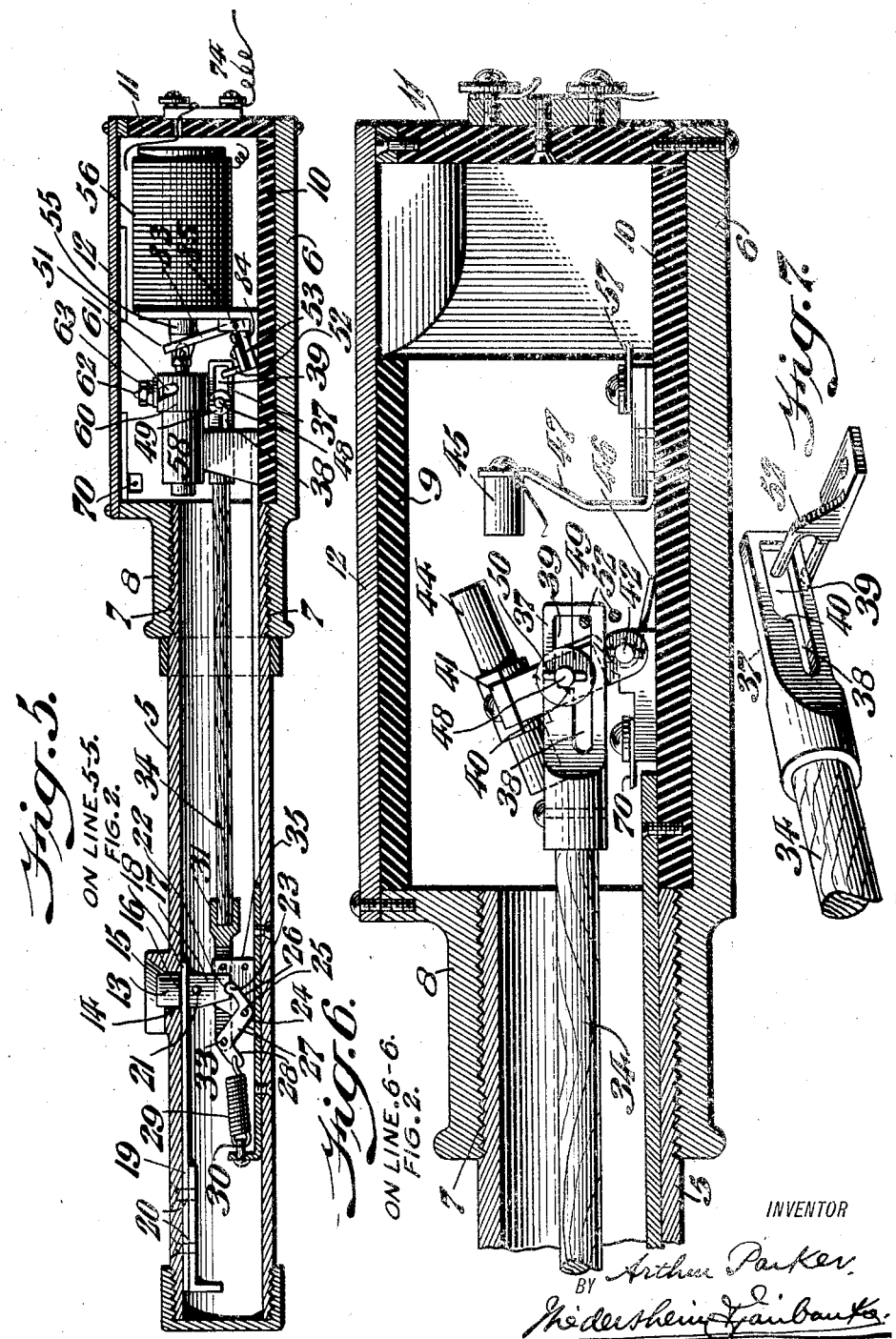

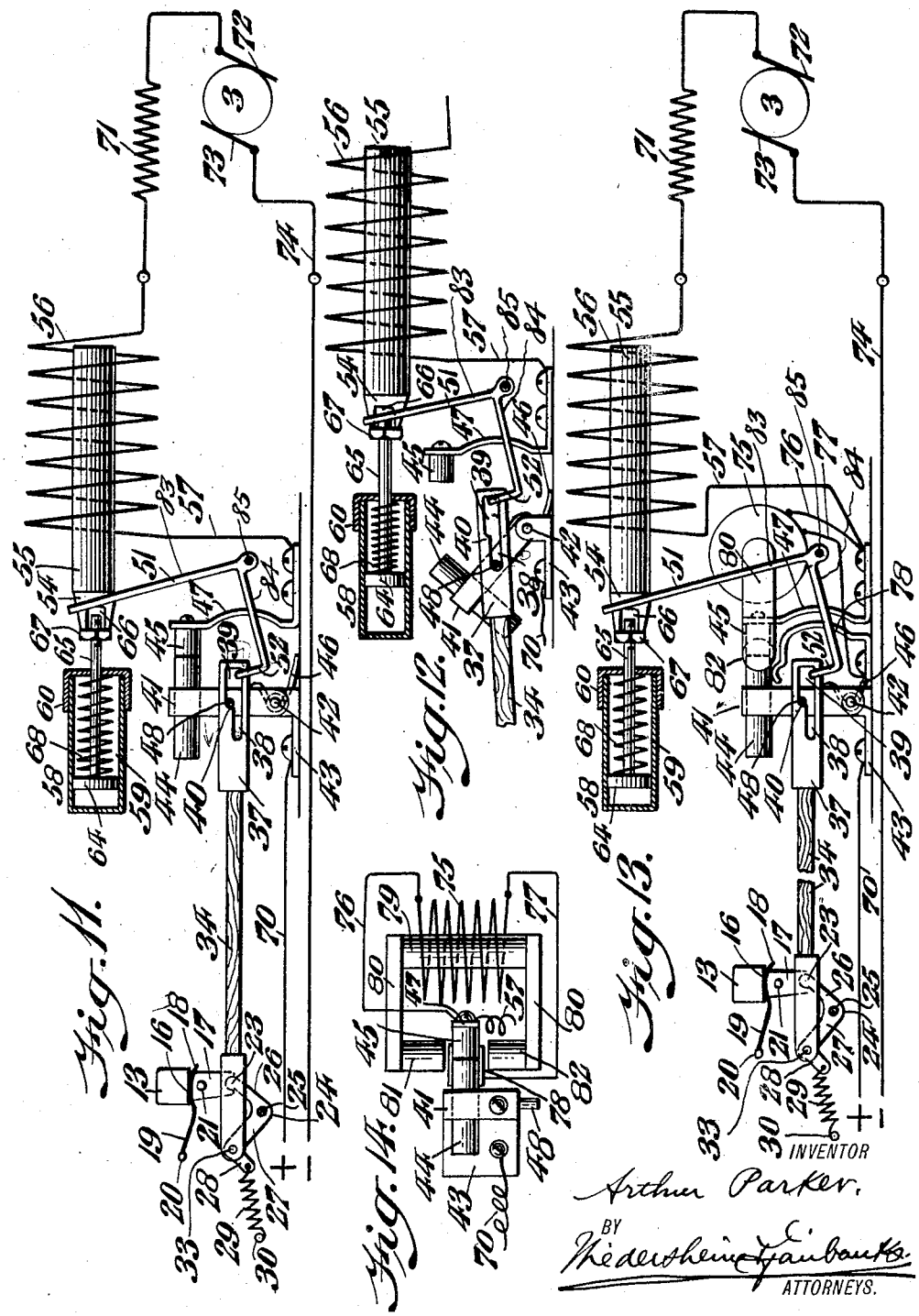

1,522,262

UNITED STATES PATENT OFFICE.

ARTHUR PARKER, OF HADDON HEIGHTS, NEW JERSEY, ASSIGNOR OF ONE-THIRD TO LEON G. BUCKWALTER, OF MERCHANTVILLE, NEW JERSEY, AND ONE-THIRD TO CHARLES REDDING, OF CLEMENTON, NEW JERSEY.

AUTOMATIC OVERLOAD-RELEASING SWITCH OR MOTOR CONTROLLER FOR PORTABLE ELECTRIC DRILLS, REAMERS, AND THE LIKE.

Application filed July 15, 1919. Serial No. 310,985.

*To all whom it may concern:*

Be it known that I, ARTHUR PARKER, a citizen of the United States, residing at Haddon Heights, in the county of Camden, State of New Jersey, have invented a new and useful Automatic Overload-Releasing Switch or Motor Controller for Portable Electric Drills, Reamers, and the like, of which the following is a specification.

At the present time, owing to the availability of electric power and in order to reduce the expense involved in the use of compressed air, it is the practice in modern industrial plants, on account of the extreme availability of said electric power and the ease of its transmission to the desired point of use, to employ electric drills, which possess advantages over pneumatic drills, since they can be connected with the ordinary electric light sockets commonly used in buildings and be operated by the current derived therefrom, so that the necessary power to run a drill of this character is practically constantly at hand in every locality.

It frequently happens, however, in portable electric tools of this character when used for drilling, reaming or the like, that the drill, reamer or other tool becomes stalled in its work, and as a result the operating motor becomes overloaded and a short circuit may be formed and the armature burned out, it being well known to those skilled in the art that one of the chief difficulties in using an electric motor in an electric drill, where a variable load is encountered, is to control the current so as to prevent it from becoming excessive and burning out the motor windings or otherwise damaging the machine, which difficulty is experienced when the operator handling the motor is inexperienced or careless, as is frequently the case.

To the above ends, my invention relates to a novel construction of motor controller or automatic overload releasing switch which is especially adapted to portable tools, such as electric rotary tools in which the motive power is electricity, wherein I utilize one of the handles employed for moving and guiding the drill or other machine for containing and operating the controlling mechanism, so that the switch controlling the circuit is automatically operated to break the circuit the moment the tool becomes stalled and the motor is overloaded, whereby I produce an efficient and reliable controlling device comprising an automatic, overload, releasing switch, whereby overloading of the drill is prevented, the number of parts is reduced to a minimum and all live parts are inclosed within the handle or an extension common to the handle and drill casing, which reduces the opportunity for electrical trouble and renders the device fool-proof and less liable to derangement than heretofore. My novel device has the dual function of prevention of injury to the operator as well as to the machine to which it is attached.

It further consists in a novel construction and collocation of an electric drill handle containing a push button, a box or handle extension in which the principal mechanical and electrical elements are contained, and a wooden spindle extending from said push button to said box, whereby all the live parts outside of the box are abolished and the opportunity for electrical trouble is reduced to a minimum.

It further consists in combination with an automatic overload releasing switch of a novel construction of a push button provided with a cam member, and tension or resetting devices, a wooden spindle which is reciprocated longitudinally through the medium of said push button by suitable connections, and a slotted cam member on the box end of said wooden spindle which engages a pin on the movable side of the switch, which upon being actuated makes contact with the opposite side of the switch, thus closing the circuit.

It further consists of novel means actuated by any abnormal rise in the current for releasing said pin, thereby throwing the switch to open position, so that it cannot again be closed until the operator releases the push button.

It further consists in the employment of a push button having a guard around it which prevents accidental closing of the switch, thus saving the operator and the machine from injury.

It further consists of a novel construction and collocation of a push button with a bell crank lever, a tension or resetting device, and means for limiting the extent of up and down movement of said push button and its adjuncts, in combination with my novel construction of automatic overload releasing switch.

It further consists of other novel features of construction, as will be hereinafter fully set forth.

For the purpose of illustrating my invention, I have shown in the accompanying drawings certain embodiments of it which are at present preferred by me, since the same will give in practice satisfactory and reliable results, although it will be understood that the various instrumentalities of which my invention consists can be variously arranged and organized and that my invention is not limited to the precise arrangement and organization of these instrumentalities as herein shown and described.

Figure 1 represents a front elevation of an electric drill shown partly in section and partly in elevation and equipped with a motor controller or automatic overload releasing switch embodying my invention.

Figure 2 represents on an enlarged scale, a plan view of the automatic, overload, releasing switch and its adjuncts embodying my invention, the cover of the box containing the principal electrical and mechanical elements being removed.

Figure 3 represents a section on line 3—3, Figure 2, showing the push button and its adjuncts.

Figure 4 represents a perspective view of the push button and its adjuncts in detached position.

Figure 5 represents a longitudinal sectional view showing certain of the parts in elevation, the section being taken on the line 5—5 of Figure 2.

Figure 6 represents on an enlarged scale a section on line 6—6 Figure 2, showing the contacts in open position.

Figure 7 represents a perspective view of the slotted cam member and a bifurcated member, shown in Figure 6, in detached position.

Figure 8 represents a plan view of the left-hand end of the wooden spindle employed, showing also a restoring spring, bell crank and its adjuncts, which are operated on the depression of the push button.

Figure 9 represents a side elevation of Figure 8.

Figure 10 represents an end view of Figure 2.

Figure 11 represents a diagrammatic view of the automatic, overload, releasing switch, showing the position the parts normally assume when the drill is in normal operation.

Figure 12 represents a diagrammatic view similar to Figure 11, but showing the position the parts assume in case of an overload, the contacts being open.

Figure 13 represents a diagrammatic view similar to Figure 11, but showing certain additional features in connection therewith.

Figure 14 represents a diagrammatic view of a modification showing a solenoid and certain contacts therefor to be hereinafter referred to.

Figure 15 represents a sectional view of the shock absorber and its adjuncts, the section being taken on line 15—15 of Figure 2.

Figure 16 represents an alternative form of shock absorber which may be employed in lieu of Figure 15.

Similar numerals of reference indicate corresponding parts.

Referring to the drawings:—

1 designates an electric drill, comprising the main casing 2, within which is arranged an electric motor 3, said casing preferably forming the field frame for said motor, and as the electric drill, per se, forms no part of my present invention and may be of any conventional type, as disclosed in Patents No. 936,870 and No. 1,109,325, I deem it unnecessary to describe the same in greater detail, as the general arrangement and collocation of the driving and driven mechanism and the reducing gearing common thereto is well known to those skilled in this art.

4 and 5 designate the diametrically opposite handles by which the drill is guided and applied to its work, and as a machine of this character is liable to be overloaded from several causes, such as the use of a drill or reamer larger than the capacity or power of the machine, or by two great pressure or feed exerted on the tool or drill, with the result that owing to the consequent stoppage or slowing down of the electric motor, the latter would be supplied with such an amount of current, as would be liable to destroy or burn out the armature windings, the novel features of my invention which obviate these disadvantages and relate particularly to the automatic, overload, releasing switch and its adjuncts contained in said handle 5 and the box or handle extension 6 seen at the left of Figure 1, will now be described in detail.

The handle 5 may be a piece of tubing and screwed at 7 into an extension 8 of the handle extension 6, which is provided with suitable top, bottom and end insulation, as indicated at 9, 10 and 11 in Figure 6, said box and handle containing the mechanical and electrical parts and protecting them from injury.

12 designates a removable top for said box or handle extension 6, so that the parts are readily accessible as seen in Figure 2.

13 designates a push button, which can be reciprocated vertically in the hole 14 in the handle 5, and is surrounded by the guard 15, whose contour will be understood from Figures 1, 2, 3 and 5, thereby preventing accidental closing of the switch, thereby saving the operator and the machine. The underside of the push button is provided with the shoulders 16 and the pendant blade or flat stem 17, whose sides are engaged by the bifurcated end 18 of the flat plate or spring 19, which is secured at the point 20 to the interior of the handle by any suitable means, the function of said spring being to tend normally to press upwardly upon the shoulders 16 so as normally to retain the push button in the position seen in Figures 3, 5, 11 and 13, the pin 21 serving to retain the forked ends 18 of said spring 19 in proper relation with respect to the pendant blade 17 and to limit the downward movement of the push button. The lower end of the pendant blade or stem 17 is provided with a recess 22, which engages the top end 23 of the arm 26 of the bell crank lever 24, which is fulcrumed at 25 and provided with the arms 26 and 27. The arm 27 has a rearward extension 28, to which is attached one end of the spring or resetting device 29, the other end of the latter being attached to a fixed point as 30, seen in Figures 5, 8, 9, 11 and 13.

31 designates a yoke having the arms 32, which are pivotally secured by the pin 33 to the arm 27 of the bell crank or elbow lever 24, said yoke having secured thereto an end of the wooden or non-conducting spindle 34, which is contained within the pipe handle 5 and extends therethrough into the switch box 6. Within the arms 32 of the yoke 31 are located the upright guides 35, see Figures 3, 5, 8 and 9, whose outer faces or walls properly guide the arms 32 of the yoke, while their inner faces serve as guides for the bell crank lever 24 and lower portion of the blade or stem 17 of the push button 13, it being further apparent that the top edges 36 of said guides act as a stop or abutment for the pin 21 so as to limit the downward movement of said pin and push button, when the latter is depressed to the proper extent, as will be understood from Figures 3 and 9. The upward movement of the push button is limited by the contact of pin 21 with the ends 18 of the flat strip 19, see Figure 3, which acts as a lock to prevent said push button from jumping out, it being apparent that the parts are held in what is the open position of the switch by the coil spring 29.

It will be seen from the foregoing that upon the depression of the push button 13, the bell crank 24 will be rocked and its end 23 depressed so that the wooden spindle and its adjuncts will be moved longitudinally to the right. The box end of the wooden spindle 34 has secured to it a slotted cam member 37, best seen in Figures 6 and 7, which comprises a plate having the narrow left-hand slot 38, which merges into the wider right hand slot 39, there being a squared shoulder or cam 40 formed on the upper wall about midway of said slot.

41 designates a contact carrying post, which is pivotally mounted at 42 on a bracket 43 secured in any desired manner within the box 6. The contact carrying post 41 is provided with the movable contact 44 and is normally retained out of engagement with the stationary contact 45 owing to the provision of a spring 46 which has its free end bearing against the bottom of the box and its opposite end bearing against the post 41 while its central portion is coiled around the pivot pin 42 so that the tendency of the spring is to retain the movable contact 44 in a position to open the circuit as seen in Figures 6 and 12. The stationary contact 45 is carried by a binding post 47 the lower end of which is deflected and secured to the bottom of the box 6 in any desired manner, as seen in Figure 6.

The post 41 is provided with a laterally extending pin 48 which extends through the slot 39 and is provided with a washer 49 and a pin 50, which retains the slotted cam member 37 in assembled position with respect to the post 41.

51 designates a lever, which in the present instance is in the form of an elbow lever, composed of the upper and lower limbs or members 83 and 84, which are fulcrumed at the point 85, the lower member 84 having connected to it a bifurcated member 52 having one arm extending into the slot 39 and its other arm extending beneath the cam plate 37, said member 52 being insulated from the lever 51 by means of insulation 53, see Figure 5.

The upper end of the lever 51 is also bifurcated to receive the flattened end 54 of the armature 55 of the overload coil 56, which is connected by the line 57 to the binding post 47.

58 designates a shock absorber comprising the casing sections 59 and 60, one of which telescopes into the said section 60 being mounted on the section 59 and provided with an inclined slot or groove 61 through which passes a threaded rod 62 fixed to the section 59 and adapted to receive the nuts 63, one of which serves as a lock nut, see Figures 2, 5 and 15. It will be understood that the cylinder section or member 60 being mounted on the section 59 is capable of being rotated thereon, and since the threaded rod or stem 62 is fixed in the section 59 and passes through the inclined slot 61, it will be apparent that when the nuts 63 are loosened and a partial rotation is imparted to the section 60, that the latter will move longitudinally with respect to the section 59, thereby varying the tension on the spring 68, so that the latter can be adjusted for varying overloads on motors of drills, reamers or the like, said nuts 63 being tightened after the above adjustment has been made.

The casing section 59 contains a plunger 64 having a rod 65 extending through the casing section 60 and into a recess 66 in one end of the armature 55. The outer end of the plunger rod 65 is threaded and in adjustable engagement with a nut 67, which is preferably integral with the armature 55 as will be understood from the right-hand end of Figure 15. Interposed between the plunger 64 and the casing section 60 is a spring 68. It will be seen that my novel shock absorber has a dual function, since it will be apparent that I enable the switch to function without injurious strains and, second, by the adjustments permitted, I can control the element of time and therefore the current flow.

It will of course be understood that any desired or conventional form of shock absorber may be employed, and in the embodiment seen in Figure 16, I have shown one in which the spring 68 is omitted, and instead of the spring I employ a cushioning medium, such as, for example oil, 69, and since the construction is otherwise the same as that of the other figures, I have given to similar parts the same reference characters. It will be understood that the oil or other cushioning medium will in practice occupy a space on both sides of the piston, and that the latter if desired may be provided with ports for permitting circulation of the cushioning medium.

The line 70, see Figure 11, leads to the bracket 43, the current flowing through the contact post 41, movable contact 44, stationary contact 45, the binding post 47, line 57 to the overload coil 56, thence to the field coil 71, brush 72, armature 3, brush 73 and return line 74.

In some instances, in case it may be desirable to extinguish an arc, it may be sometimes advisable to employ a blow out coil as shown in Figures 13 and 14, it being understood that any desired type of blow out coil may be employed.

The blow out coil has its winding 75 connected by a line 76 with the stationary contact 45. The other end of the winding is connected by a line 77 with a binding post 78 having the formation of a spring, the lower end of which is in fixed position and the upper end of which extends upwardly beneath the movable contact 44. The core 79 of the blow out coil has the pole pieces 80 which terminate in the poles 81 and 82, it being understood that the contact 78 makes contact with the contact 44 both when the same is closed and also when nearly closed.

The operation is as follows:—

It will be understood from Figures 3, 5, 9, 11, and 13 that the push button is normally held in elevated or normal position by means of the spring 19 or its equivalent. When the push button is depressed the recess or seat 22 in the bottom thereof engages the end 23 of the bell crank lever 24, so that said end 23 is depressed, whereupon the fulcrum point 33 and the arms 32 and their adjuncts move to the right of the position seen in Figure 5 against the tension of the spring 29, thereby imparting a longitudinal movement to the right to the wooden rod 34, and its adjuncts. The rod 34 is moved to the left or reversed from its extreme right hand position already described by reason of the tension on the spring 29, which resets the push button mechanism seen in Figures 8, 9, 11 and 13.

The parts normally appear, when the drill or reamer is in operation, as seen in Figures 5 or 11, it being apparent that upon the depression of the button 13, its vertical motion through the intermediate connections moves the wooden spindle 34 horizontally and longitudinally, so that the slotted cam member 37 will engage the pin 48 the parts being now in the position seen in Figure 11, whereby the movable contact 44 moves from the position seen in Figures 2, 6 and 12, into contact with the stationary contact 45, so that the circuit is closed and the parts assume the position seen in Figures 11 and 13.

Now since the electro-magnet 56 is connected in series with the motor 3, any rise in the current above that for which the adjustable armature spring 68 is set, enables the coil to overcome the tension of said spring, whereupon the core moves into the magnet 56, carrying with it the forked lever 51 and forked member 52, which latter rises from the position seen in Figures 11 or 13 and kicks the slotted cam member 37 upwardly, so that the shoulder 40 becomes disengaged from the pin 48, which latter is released, and the helical spring 46 throws the switch to open position, the parts now appearing as seen in Figures 2, 6 and 12, the circuit being now open without damaging or endangering the electric motor. The motor thus carries not more than a predetermined amount of load and is cut out at an excessive load. It will be apparent that by reason of the pivotal mounting of the lever 51 on its fulcrum 85, the requisite amount of play of the forks 52 is permitted with respect to the cam 40 and the slot 39.

The provision of the springs 19 and 29 causes the push button 13 and the elbow lever 24 to always assume or be restored to their proper positions, and the spring 46 and its adjuncts causes the movable contact 44 to be instantaneously actuated upon the tripping of the pin 48, as is evident. The tension of the spring 29, in the resetting of the device, tends to move the spindle 34 to the left, which is overcome by the depression of the button 13, which latter, when depressed moves the various elements from the position seen in Fig. 12 to the position seen in Fig. 11, and when the member 37 and the post 41 assume the position seen in Fig. 11, the pin 48 comes into engagement with the shoulder 40, and is locked with respect thereto.

I preferably arrange the contacts 44 and 45 in the box or handle extension 6 at one side of the other elements as the coil 56, the shock absorber, the slotted cam 37 and its adjuncts, but it is evident that the precise arrangement or collocation of these instrumentalities can be changed. It will be apparent from the foregoing that all the operative parts of my device are contained within the handle or handle extension 6 and are correlated in close proximity to the drill proper, so that the drill and its handles can be conveniently manipulated, as is evident. I desire to call special attention to the fact that all the principal operative parts of my invention are located in the handle or handle extension thereof, and so far as I am aware, I am the first in the art to locate in the handle of an electric drill or reamer, a switch and means for automatically releasing said switch when the drill motor is overloaded, and I am also the first in the art in a device of this character, to connect a shock absorbing device to the armature of the electro-magnet employed, and my claims to these features are to be interpreted with the scope accorded to inventions of this character.

It will now be apparent that I have devised a novel and useful construction of an automatic overload releasing switch or motor controller for portable electric drills, reamers and the like, which embodies the features of advantage enumerated as desirable in the statement of the invention and the above description, and while I have, in the present instance, shown and described a preferred embodiment thereof which will give in practice satisfactory and reliable results, it is to be understood that the same is susceptible of modification in various particulars without departing from the spirit or scope of the invention or sacrificing any of its advantages.

Having thus described my invention, what I claim as new end desire to secure by Letters Patent, is:—

1. In a device of the character stated, a nonconducting spindle, a cam member carried thereby and having a slot therein provided with a shoulder, means for operating said spindle, a movable contact having a pin engaging said slot, an electromagnet, a shock absorber, an armature for said magnet, connected to said shock absorber, and a lever operated by said armature and carrying a forked member engaging said slot and shoulder, said magnet being adapted automatically to lift said forked member and open the circuit at a predetermined load.

2. In a switch a movable contact element, a spring to move the contact element to the open position when released, a pin connected with the contact element, a member arranged to slidably contact with the pin and having a shoulder to engage therewith, manually operated means to move the member in one direction, a device connected with the circuit and including a movable element, a forked member connecting said movable element and the above mentioned slidable member, to shift it for effecting a disengagement between the shoulder and pin upon the inward movement of the movable element, and yielding means for opposing the inward movement of the movable element.

3. In a switch, a movable contact element, a spring to automatically move the contact element to the open position when released, a pin connected with the contact element, a member having a longitudinal slot for the slidable reception of the pin and provided in its side wall with a shoulder to engage the pin, manually operated means to effect a longitudinal movement of the member, a device connected in the circuit and embodying a movable element, means connecting the movable element and member so that the inward movement of said movable element will shift the member laterally, and yielding means to oppose the inward movement of said member.

4. In a device of the character stated, the combination of a handle, an electromagnet in said handle, an armature for said magnet, a shock absorber for said armature, a switch within said handle, and means in said handle for automatically releasing said switch in case of an overload.

5. In a device of the character stated, the combination of a handle, an electromagnet contained within said handle, an armature for said magnet, a shock absorber for said armature, a switch also contained in said handle, means in said handle for automatically releasing said switch in case of an overload, and means carried by said handle for closing said switch.

6. In a device of the character stated, the combination of a handle, a handle extension, an electromagnet in said handle extension, an armature for said magnet, a shock absorber for said armature and in line therewith, a switch in said casing, and means carried by said handle for automatically releasing said switch in case of an overload.

7. In a device of the character stated, the combination of a handle, a handle extension, an electro-magnet in said handle extension, an armature for said magnet, a shock absorbing device connected to said armature and in alignment therewith, a switch in said handle extension, and means in said handle extension for automatically releasing said switch in case of an overload.

8. In a device of the character stated, the combination of a handle, an electro-magnet located in said handle, an armature for said magnet, a shock absorber for said armature, a switch also in said handle, means in said handle for automatically releasing said switch in case of an overload, and means for effecting the closing of the switch.

9. In a device of the character stated, the combination of a handle, an electro-magnet located in said handle, an armature for said magnet, a shock absorber for said armature, a switch also in said handle, means in said handle for automatically releasing said switch in case of an overload, means for effecting the closing of the switch, and means in said handle for automatically resetting the switch closing means.

10. In a device of the character stated, the combination of a handle, an electro-magnet carried by said handle, an armature for said magnet, a switch also contained within said handle, means in said handle for automatically releasing said switch in case of an overload, a connection means for effecting the closing of the switch, and a shock absorbing device connected to said armature.

11. In an automatic overload releasing switch, a movable contact having a pin thereon, a stationary contact, manually operable means engaging said pin to close said contacts and retain them in closed position, and electro-magnetic means for automatically opening said contacts in case of an overload.

12. In a device of the character stated, a casing consisting of a handle, an automatic overload releasing switch mechanism carried by said casing and comprising a movable contact having a pin thereon, a stationary contact, manually operable means engaging said pin to close said contacts and retain them in closed position, and electro-magnetic means for automatically opening said contacts in case of an overload.

13. In a device of the character stated, the combination of a handle, an electro-magnet carried by said handle, an armature for said magnet, a shock absorber connected to said armature, a switch within said handle, and means in said handle for automatically releasing said switch in case of an overload.

14. In a device of the character stated, the combination of a handle, an electro-magnet in said handle, an armature for said magnet, a shock absorber connected to said armature, a switch within said handle, and comprising a stationary contact and a movable contact, a blow-out coil having one end connected to said stationary contact and its other end to a binding post which makes contact with said movable contact both when the latter is closed and partly closed, and means in said handle for automatically releasing said switch, in case of an overload.

15. The combination of a switch comprising a fixed contact and a movable contact, a manually reciprocated cam member for releasably holding the fixed and movable contacts in contact, an electro-magnet, an armature for said magnet, and means connected to said armature and cam member for releasing the fixed and movable contacts from contact.

16. The combination of an electro-magnet, an armature for said electro-magnet, means for opposing the movement of said armature, a fixed contact, a movable contact, a reciprocating cam member adapted to retain said contacts in engagement, and means connected to said armature and cam member for releasing the contacts from engagement.

17. The combination of an electro-magnet, an armature for said magnet, a fixed contact, a movable contact, a reciprocating cam member adapted to normally retain said contacts in engagement, means connected to said armature and cam member for releasing the contacts, and spring pressed means for withdrawing said armature from said electro-magnet.

18. In a device of the character stated, the combination of a handle, means in said handle for controlling the operation of the implement carrying said handle, electro-magnetic means also in said handle for automatically controlling the overload, and a shock absorber connected to the armature of said electro-magnetic means.

ARTHUR PARKER.

Witnesses:
J. W. MEEKER,
JOHN R. HARROP.